United States Patent [19]

Halasa et al.

[11] 3,897,406
[45] July 29, 1975

[54] PROCESS FOR POLYMERIZING CONJUGATED DIENES

[75] Inventors: Adel Farhan Halasa, Bath; Adolph Para, Akron, both of Ohio

[73] Assignee: The Firestone Tire & Rubber Company, Akron, Ohio

[22] Filed: Dec. 10, 1973

[21] Appl. No.: 423,379

[52] U.S. Cl. ............................ 260/83.7; 260/94.2 M
[51] Int. Cl.² ................. C08F 236/10; C08F 136/06
[58] Field of Search ....................... 260/94.2 M, 83.7

[56] References Cited
UNITED STATES PATENTS

| | | | |
|---|---|---|---|
| 2,797,208 | 6/1957 | Burke, Jr. | 260/94.2 M |
| 3,067,187 | 12/1962 | Greenberg et al. | 260/82.1 |
| 3,317,437 | 5/1967 | Hoffman et al. | 260/93.5 R |
| 3,418,297 | 12/1968 | Grinninger et al. | 260/82.1 |
| 3,423,379 | 1/1969 | Grinninger et al. | 260/82.1 |
| 3,726,832 | 4/1973 | Komatsu et al. | 260/83.7 |

Primary Examiner—Paul R. Michl

[57] ABSTRACT

Conjugated dienes are polymerized by a new catalyst system which permits control of the molecular weight and gives a more easily processed product than obtained with an Alfin-type of polymerization. This catalyst system comprises: (1) sodium allyl compound having 3–10 carbon atoms, (2) a sodium alkoxide or aryloxide of 1–10 carbon atoms, and (3) an alkyl aryl ether, such as an anisole. The diene polymers produced by this process have controllable molecular weights in the range of 5,000–500,000, preferably 100,000–200,000, broad molecular weight distribution, glass transition temperatures higher than normally obtained and high degree of branching, while retaining the desired crystallinity and microstructure of Alfin-type polymers, and having much improved processability for the production of rubber and other compositions for commercial use.

14 Claims, No Drawings

PROCESS FOR POLYMERIZING CONJUGATED DIENES

BACKGROUND OF THE INVENTION

1. Field of the Invention

This invention relates to a process for the polymerization of dienes using a catalyst composition comprising a sodium allyl compound, a sodium alkoxide or aryloxide and an alkyl-aryl ether, such as anisole.

2. Related Prior Art

The polymerization of conjugated dienes can be effected in a variety of methods. However, there are various disadvantages in the various methods presently known including undesirable or uncontrollable properties in the products, such as lack of control of molecular weight, molecular weight distribution and processability of the polymers.

For example, the so-called "Alfin" catalyst system which has been studied extensively produces polybutadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, Vol. 94, October 1963, pp. 87–92. This Alfin catalyst system effects very rapid formation of a very high molecular weight polymer having molecular weights of about 5,000,000 with about 75 percent of the polymer in the trans-1,4 configuration.

Polybutadienes prepared by the use of n-butyllithium in n-hexane have about 8–10 % 1, 2-, 53–54 percent trans-1,4 and 35–37 percent cis-1,4 configurations. By using polar modifiers or solvents, such as ether, amines, etc., the vinyl content is increased to up to 50–70 percent. However, the molecular weight distribution in such cases is so narrow as to give poor processability. Moreover, the polar modifiers act as chain terminators and prevent active polymer products that might be coupled or otherwise post-treated to improve processability.

Processability is very important for commercial rubber tire production. Among other disadvantages poor processability results in poor adhesion to fillers and thereby gives poor reinforcement. High glass transition temperatures in butadiene polymers generally indicate and accompany good wet traction.

For desirable properties in tire compositions, it is advantageous to have about 75 percent trans-1,4 as produced in Alfin-type polymerizations. However, as previously stated, these products have extremely high molecular weight and very poor processability. For example, Alfin catalysts generally give products having Mooney viscosities of about 150–190. For good processability the Mooney viscosity is advantageously below 100. Mooney viscosities of 30 to 100 are characteristic of the polymers of this invention.

Foster U.S. Pat. No. 2,841,574 discloses that the modification of "Alfin" polymerizations by the use of certain selective solvents in conjunction with the "Alfin" catalyst gives "a wholly different molecular structure" in the final polymer product. The patentee identifies these selective solvents as "certain ethers, acetals and amines." In the list of suitable ethers given in the section running from line 50, column 3, through line 5 of column 4, there are no aryl ethers indicated and particularly no alkyl-aryl ethers. In other words, all the ethers listed have both the ether oxygen bonds connected to aliphatic carbon atoms and in no such case is an ether oxygen connected to a carbon of an aromatic nucleus.

Moreover, while patentee states that his process modified by such ether solvents gives "a wholly different molecular structure," he does not indicate what such different molecular structure comprises. It has been found, however, that the modification of an "Alfin" polymerization with the type of aliphatic ethers listed by patentee actually give a much higher 1,2 content, generally about 60 percent or more, and a much lower trans-1,4 content in the polymer than produced by the unmodified polymer.

Therefore, while it is desirable to reduce the molecular weight and improve the processability of "Alfin" type polymer, it is highly desirable, where the polymer product is to be used in tire manufacturing compositions, that the high trans-1,4 structure of the "Alfin" polymer should be retained.

SUMMARY OF THE INVENTION

In accordance with the present invention, it has now been found that conjugated diene polymers of controllable molecular weight, broad molecular weight distribution, good processability, high glass transition temperatures and good wet traction are produced by the use of a catalyst system comprising the combination of (1) a sodium allyl compound having 3–10 carbon atoms, (2) a sodium alkoxide of 1–10 carbon atoms, preferably a secondary alkoxide, and (3) an alkylaryl ether, such as anisole. A fourth component, namely a sodium halide, can be present in the catalyst system depending on the method used in preparing the sodium allyl compound.

The presence of the alkyl-aryl ether effects a reduction of the molecular weight of the product from about 5,000,000 to about 500,000 and of the dilute solution viscosity from about 13 to about 3–6, but does not alter the basic microstructure from that obtained with the unmodified Alfin catalyst. Consequently the processability is improved without losing the advantages of the Alfin-type of microstructure.

Surprisingly, anisole and the other alkyl-aryl ethers act differently as modifiers in this type of polymerization in contrast to ethers that are generally used as solvent modifiers in anionic polymerizations such as diethyl ether, tetrahydrofuran, dioxane, ethylene glycol dimethyl ether, etc. These latter ethers affect the microstructure of the resultant polymer to give much less trans-1,4 and much higher 1,2 structure, generally 60 percent 1,2 or higher. Moreover, these ethers are much less stable in the presence of the Alfin-type catalyst as compared to anisole and the other alkyl-aryl ethers, particularly at elevated temperatures. Furthermore, in the present invention anisole and the other alkyl-aryl ethers are effective as modifiers in very small proportions, generally about one part per 100 parts of monomer, whereas the other ethers are used in much larger proportion and even in these larger proportions do not have the same effect as anisole, etc.

The hydrocarbon portion of the sodium allyl component has 3–10 carbon atoms, and even though larger groups can be used, there is no particular advantage. The sodium can be attached to a primary, secondary or tertiary carbon atom.

These can be prepared by the reaction of metallic sodium with an alkyl halide, and propylene reacted with the resultant sodium alkyl to give the sodium allyl compound and an alkane corresponding to the alkyl group used. In cases where it is desired to prepare the sodium hydrocarbon free of the by-product sodium halide, this can be done by preparing it in a liquid which is a solvent for the sodium hydrocarbon but not for the sodium halide, such as diethyl ether, tetrahydrofuran, or other ether. Or after preparation in a hydrocarbon medium the sodium alkyl or allyl can be extracted in an ether solvent. Then after the salt has been separated from the solution by decantation or filtration, a higher boiling hydrocarbon is added and the ether removed by distillation, using reduced pressure to keep the temperature low. Another method for accomplishing this is shown below in Example III.

In the sodium alkoxide, the hydrocarbon portion advantageously has 1 to 10 carbon atoms. While even larger groups can be used, again there is no added advantage, and such resultant compounds are more sluggish in their activity. The sodium alkoxide is prepared by the reaction of metallic sodium with an alcohol. This can be prepared separately and excess sodium is used to insure that no unreacted alcohol remains to react with the intermediate sodium hydrocarbon or with the sodium allyl compound upon mixture of the alkoxide therewith. Some sodium alkoxides, such as t-butoxide, are available commercially.

In this catalyst combination, the system is most active when there is one mole of sodium alkoxide per mole of the sodium allyl compound. If there is less than a 0.5 mole per mole ratio, the catalyst is unsuitable, and if there is a considerable excess of the alkoxide over a 2.5-1 mole ratio, the catalyst is much less effective compared with the 1—1 optimum ratio. However, as the ratio decreases or increases from this optimum amount, there is some activity, since there will be at least a portion of the sodium allyl compound associated with one mole of the alkoxide. Consequently, it is desirable to keep within the range of 0.5-2.5 moles of sodium alkoxide per mole of sodium allyl compound.

If a sodium halide is present, it is generally in the amount deposited by the reaction of sodium with the halo-hydrocarbon by which the sodium hydrocarbon intermediate is formed, so that generally there is a mole of sodium halide per mole of sodium allyl. The halide is generally the chloride or bromide, since these are more economical than the fluoride and iodide.

This portion of the catalyst can be prepared at room temperature, but preferably at 0° C. or even lower.

The anisole or other alkyl-aryl ether may be added with the above portion of the catalyst or may be added with the monomer. The monomer may be added all at once to the catalyst system suspended in a solvent, or may be fed in gradually with the anisole, etc. contained therein or with the anisole already contained in the catalyst suspension. The anisole is generally used in an amount of 1-10 parts, preferably 1-5 parts, per 100 parts of monomer, and the other alkyl-aryl ethers are used in amounts equivalent to the anisole depending on their respective molecular weights. The anisole or other alkyl-aryl ether may be used in larger amounts, but there is no added advantage and such larger amounts are impractical because of the greater expense involved.

In addition to anisole, other suitable alkyl-aryl ethers are those having 1-8, preferably 1-3, carbon atoms in the alkyl group, and 6-15 carbon atoms in the aryl group, including such ethers as methyltolyl, ethylphenyl, ethyltolyl, methylxylyl, methylnaphthyl, ethyl xylyl, ethylnaphthyl, propylphenyl, butylphenyl, amyltolyl, hexylphenyl, etc.

Typical sodium hydrocarbon compounds that can be used as intermediates in the preparation of the sodium allyl compound include compounds in which the hydrocarbon portion is methyl, ethyl, n-propyl, isopropyl, n-butyl, sec.-butyl, t-butyl, n-amyl, sec.-amyl, t-amyl, n-hexyl, sec.-hexyl, t-hexyl, n-octyl, 1,1,5-trimethyl-pentyl, n-decyl, 1-methyl-2,4-diethylpentyl, phenyl, tolyl, ethylphenyl, naphthyl, methylnaphthyl, benzyl, phenethyl, etc.

The sodium allyl compounds suitable for the purpose of this invention can be represented by the formula $CH_2=CHC(R)_2Na$ wherein R represents hydrogen or an alkyl group of 1-7 carbon atoms. Allyl sodium is the preferred compound but the following derivatives of the allyl compound can also be used: alpha-methyl, alpha,alpha-dimethyl, alpha-ethyl, alpha-isopropyl, alpha,alpha-diethyl, alpha-amyl, alpha-heptyl, alpha,alpha-dipropyl, and the like.

Typical sodium alkoxides that are suitable include those in which the hydrocarbon portions are methyl, ethyl, isopropyl, n-propyl, n-butyl, sec.-butyl, t-butyl, n-amyl, sec.-amyl, t-amyl (or 1,1-dimethyl propyl), n-octyl, sec.-nonyl, n-decyl, 1,1,4-trimethyl-pentyl, 1-methyl-1,4-diethyl-pentyl, cumyl, 1-methyl-1-phenyl propyl, and the like.

The catalyst is used in a proportion of 0.1 to 4 millimoles per 100 grams of monomer. In referring to millimoles of catalyst, this corresponds to the millimoles of sodium allyl compound since the catalyst is regarded or at least calculated as a complex of the sodium allyl compound with the other catalyst components.

Polymerization is advantageously conducted at a temperature of 30°-200° C., preferably 40°-150° C. At these temperatures polymers are produced with yields as high as 98-99 percent and molecular weights generally no higher than 500,000, preferably in the range of about 100,000 to 200,000. The microstructure is similar to that of the known Alfin-catalyzed polymers, generally about 75 percent trans-1,4 and about 25 percent 1,2. With butadiene-styrene copolymers of about 70 and 30 percent respectively, the process of this invention gives less than 30 percent 1,2 in the butadiene portion and generally about 20-25 percent 1,2 with the remainder being primarily trans-1,4. These are found to have excellent wet traction and good wearing properties in tire compositions.

The polymerization is advantageously effected in the presence of an inert diluent to facilitate handling of the polymer and to give better temperature control. Normally liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either.

Conjugated dienes that may be polymerized in accordance with this invention include: 1,3-butadiene, isoprene, chloroprene, 2-phenyl-1,3-butadiene, piperylene, etc.

Butadiene copolymers can also be prepared where the comonomers impart desirable properties and do not detract from the polymer properties. The comonomers may be other dienes or olefins, such as butene-1, n-butene-2, isobutylene, n-pentene-1, n-pentene-2, and the like, and preferably vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, 1-vinyl-4-chloronaphthalene, 1-isopropenyl-5-chloronaphthalene, vinyl diphenyl, vinyl diphenylethane, 4-vinyl-4'-methyl-diphenyl, 4-vinyl-4'-chlorodiphenyl, and the like. Preferably such comonomers have no more than 12 carbon atoms. Where such comonomers are to be used, generally at least 1 percent, preferably at least 5 percent by weight should be used, and as much as 60 percent, preferably no more than 30 percent may be used.

The "dilute solution viscosity" referred to above is defined as the inherent viscosity determined at 25° C. on a 0.4 percent solution of the polymer in toluene. It is calculated by dividing the natural logarithm of the relative viscosity by the percent concentration of the solution, i.e., it is the inherent viscosity measured at 0.4 percent concentration. The molecular weights reported herein are determined from these viscosities and are the number average molecular weights.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

An Alfin catalyst is prepared by the following procedure: dry hexane (660 parts) is charged to a 3-necked flask provided with stirrer, inert gas sweep, a Dry Ice reflux condenser system and an external cooling bath. To this is added 36.8 parts of finely-divided sodium (2 microns maximum particle size) dispersed in xylene. The slurry is cooled to −10° C., and 85.4 parts of dry n-amyl chloride (0.8 mole) is added slowly with moderate stirring which is continued for one hour after the addition has been completed. Then 24 parts of isopropyl alcohol is added slowly. Stirring is then maintained for an additional 45 minutes. Excess dry propylene (C.P. grade) is subsequently introduced into the mixture, the temperature of which is maintained at −10° C. until active reflux of the propylene occurs. The temperature is then raised gradually to 25° C., and the mixture is stirred at this temperature for two hours. During the last 15 minutes the propylene is allowed to leave the system and is collected for recycle. The reaction slurry is transferred to a storage vessel maintained in an inert atmosphere of argon and is then diluted to 1,120 parts with dry hexane. This slurry contains 0.4 mole of sodium isopropoxide, 0.4 mole of allyl sodium, and 0.8 mole of sodium chloride, and is considered to have 0.4 mole of catalyst complex.

EXAMPLE II

To a moisture-free reactor equipped with stirrer, which has been flushed with dry nitrogen, there is added 433 gm. of a hexane solution containing 100 gm. of butadiene. The solution is stirred for about 10 minutes at 30° C. and 1.528 millimoles of the Alfin catalyst prepared as described in Example I are added with a hypodermic syringe under 50 lbs. of nitrogen pressure at 30° C. The system is immediately closed and the reactor maintained at 30° C. for about 4 hours. The polymer is collected by pouring the mixture into a large amount of methanol containing 20 ml. of an antioxidant such as p-phenylenediamine. The polymer is dried and a yield of 98 percent of theoretical is obtained. The molecular weight of the polymer is approximately 5,000,000, and the 1,2 repeating unit content is about 20 percent with the remainder being primarily trans-1,4.

EXAMPLE III

Halide-free allyl Na is prepared by the following procedure: To 600 ml. of a hexane solution containing 1 mole of halide-free n-BuLi there is added with stirring and under a nitrogen atmosphere 600 ml. of a cyclohexane solution containing 1 mole of Na t-amyloxide. The n-BuNa precipitate is filtered and washed under nitrogen several times with cyclohexane. This material upon analysis shows only 0.044 percent Li being present. This n-BuNa is then suspended in 600 ml. of cyclohexane (or hexane) and the container pressurized to 60 p.s.i. with propylene. Halide-free allyl Na is formed and the by-product butane is diluted with and removed eventually with the excess propylene. When the polymerization of Example II is repeated using an equivalent amount of catalyst prepared halide-free as described above, the polymer is substantially identical in molecular weight and microstructure to that of Example II.

EXAMPLE IV

A 2-gallon stainless steel reactor, equipped with a stirrer and nitrogen inlet and outlet, is filled with hexane plus 8 ml. of 1.5 M n-BuLi and then discharged under nitrogen atmosphere to insure that the reactor is free of catalyst deactivating impurities. Then the reactor is charged with 3 lbs. of cyclohexane and 33 millimoles of Alfin catalyst prepared as in Example I. The monomer blend contains

```
7.74 lbs. cyclohexane
1.11 lbs. butadiene
0.13 lbs. styrene
0.02 lbs. (10 gms.) anisole
```

With the reaction mass maintained at 150° C., the monomer blend is fed into the reactor at a rate of one lb. per hour. Polymerization starts immediately and reaction is continued under a pressure of about 100 psig until 1 hour after the feeding is completed. The product is then dropped into isopropanol containing 1 percent antioxidant (di-t-butyl-p-cresol). The polymer is drum dried. This procedure is repeated twice and the averages of the percent conversion, Mooney viscosity, percent styrene, Williams Recovery and microstructure are as follow:

| | |
|---|---|
| Percent conversion | 75.7 |
| Mooney viscosity (ML4/212) | 41.3 |
| Percent styrene | 13.9 |
| Trans-1,4 % | 57.1 |
| 1,2 (%) | 42.9 |
| Williams Recovery | 5.77 |

EXAMPLE V

The procedure of Example IV is repeated twice using 400 ml. of Alfin catalyst having 0.30 MM/ml or a total of 120 MM. The monomer feed blend contains:

| | | |
|---|---|---|
| 7.76 | lbs. | cyclohexane |
| 1.11 | lbs. | of butadiene |
| 0.12 | lbs. | of styrene |
| 0.006 | lbs. | (2.7 gms.) anisole |

The averages of the respective values for the two polymer products are:

| | |
|---|---|
| Percent conversion | 76.5 |
| Mooney viscosity | 80.5 |
| Percent styrene | 11.25 |
| 1,2-Structure (%) | 40.50 |

EXAMPLE VI

The procedure of Example IV is repeated using 120 MM of Alfin catalyst and the proportions:

| | | |
|---|---|---|
| 9.97 | lbs. | cyclohexane (Total) |
| 1.03 | lbs. | butadiene |
| 0.114 | lbs. | styrene |
| 0.0159 | lbs. | (7.3 g.) anisole |

The temperature during polymerization is 120°–153° and the pressure is 90 psig. The respective values for the polymer product are:

| | |
|---|---|
| Percent conversion | 100 % |
| Mooney viscosity | 69.5 |
| Percent styrene | 11.0 |
| 1,2 (%) | 43.5 |

EXAMPLE VII

The procedure of Example IV is repeated twice using in each case 600 ml. of Alfin catalyst having 0.15 MM/ml. for a total of 90 MM. The proportions of other materials are:

| | | |
|---|---|---|
| 10.71 | lbs. | cyclohexane (Total) |
| 1.15 | lbs. | butadiene |
| 0.128 | lbs. | styrene |
| 0.006 | lbs. | (2.56 gms.) anisole |

The temperature during polymerization is maintained at 120°–155° C. and the pressure is 90–120 psig. The respective values for the two polymer products are averaged to give:

| | |
|---|---|
| Percent conversion | 100 |
| Mooney viscosity (ML$_4$/212°) | 49.0 |
| Percent styrene | 13.2 |
| 1,2 (%) | 38.0 |

EXAMPLE VIII

The procedure of Example IV is repeated twice using in each case 500 ml. of Alfin catalyst having 0.22 MM/ml. for a total of 110 MM. The proportions of other materials are:

| | | |
|---|---|---|
| 10.9 | lbs. | cyclohexane (Total) |
| 1.18 | lbs. | butadiene |
| 0.12 | lbs. | styrene |
| 0.006 | lbs. | (2.64 gms.) anisole |

The temperature during polymerization is maintained at 118°–157° C. and the pressure is 50–150 psig. The respective values for the two polymers are averaged to give:

| | |
|---|---|
| Percent conversion | 91.5 |
| Mooney viscosity (ML$_4$/212°) | 34.0 |
| Percent styrene | 10.5 |
| 1,2 (%) | 36.5 |
| Williams Recovery | 5.85 |

EXAMPLE IX

The procedure of Example IV is repeated two times using in each case 300 ml. of Alfin catalyst containing 0.20 MM/ml. for a total of 60 MM. The proportions of other materials are:

| | | |
|---|---|---|
| 10.37 | lbs. | of cyclohexane (Total) |
| 1.15 | lbs. | of butadiene |
| 0.49 | lbs. | of styrene |
| 0.004 | lbs. | (1.97 gms.) of anisole |

The polymerization temperature is maintained in the range of 43°–76° C. and the pressure at 25–100 psig. The average values for the respective properties are:

| | |
|---|---|
| Percent conversion | 100 |
| Mooney viscosity | 72 |
| Percent styrene | 30 |
| Williams Recovery | 4.25 |

EXAMPLE X

The procedure of Example IV is repeated three times using in each case 300 ml. of Alfin catalyst containing 0.20 MM/ml. for a total of 60 MM. The proportions of other materials are:

| | | |
|---|---|---|
| 11.25 | lbs. | of cyclohexane (Total) |
| 0.73 | lbs. | of butadiene |
| 1.02 | lbs. | of styrene |
| .004 | lbs. | (1.97 gms.) of anisole |

The polymerization temperature is maintained in the range of 40°–75° C. and the pressure at 25–100 psig. The average values for the respective properties are:

| | |
|---|---|
| Percent conversion | 95 |
| Mooney viscosity | 37.7 |
| Percent styrene | 49.8 |
| Williams Recovery | 3.42 |
| DSV | 2.65 |

EXAMPLE XI

The procedure of Example IV is repeated three times using alpha-methylstyrene instead of styrene and using in each case 300 ml. of Alfin catalyst containing 0.20 MM/ml. for a total of 60 MM. The proportions of other materials are:

| | | |
|---|---|---|
| 10.84 | lbs. | cyclohexane (Total) |
| 1.21 | lbs. | butadiene |
| .52 | lbs. | alphamethylstyrene |
| .004 | lbs. | (2.64 gms.) anisole |

The polymerization temperature is maintained in the range of 41°–72° C. and the pressure at 25–100 psig. The averages for the respective values for the three polymer products are:

| | |
|---|---|
| Percent conversion | 87.6 |
| Mooney viscosity | 104.8 |
| Percent alphamethylstyrene | 12.5 |
| Williams Recovery | 7.72 |

EXAMPLE XII

The procedure of Example IV is repeated twice using the identical amounts and conditions with the exception that the styrene is omitted so as to produce polybutadiene. The average values of the two runs are as given below:

| | |
|---|---|
| Percent conversion | 81.5 |
| Mooney viscosity (ML4/212) | 28.1 |
| Trans-1,4 (%) | 62.5 |
| 1,2 (%) | 37.5 |
| Williams Recovery | 2.76 |
| Glass transition temp. (Tg) | −90° C. |
| Melting point (Tm) | 48° C. |

EXAMPLE XIII

The procedures of Examples IV and V are repeated using an equivalent amount of the halide-free catalyst prepared as in Example III. The results are similar to those obtained in Examples IV and V.

EXAMPLE XIV

The procedure of Example IV is repeated a number of times with satisfactory results using in place of the cyclohexane equivalent amounts respectively of:
a. hexane
b. 50—50 mixture of hexane and cyclohexane
c. 50—50 mixture of benzene and cyclohexane
d. toluene

EXAMPLE XV

The procedure of Example IV is repeated a number of times with similar results using in place of the sodium allyl equivalent amounts respectively of other sodium allyl compounds as follows:
a. alpha-methylallyl sodium
b. alpha, alpha-dimethylallyl sodium
c. alpha-ethylallyl sodium
d. alpha-amylallyl sodium
e. benzyl sodium

EXAMPLE XVI

The procedure of Example IV is repeated a number of times with similar results using as the monomer an equivalent weight respectively of:
a. isoprene
b. chloroprene
c. piperylene
d. 2-phenyl-1,3-butadiene
e. 75–25 mixture of isoprene and styrene
f. 70–30 mixture of butadiene and vinyl toluene
g. 80–20 mixture of butadiene and n-butene-1
h. 70–30 mixture of butadiene and isoprene
i. 75–25 mixture of isoprene and n-hexane-1

EXAMPLE XVII

The procedure of Example IV is repeated a number of times with similar results using in place of the anisole equivalent amounts respectively of:
a. methyl tolyl ether
b. methyl naphthyl ether
c. ethyl phenyl ether
d. isopropyl phenyl ether
e. methyl diphenyl ether In preparing the polymers of this invention, a substantial proportion of polymer is produced when the polymerization is conducted for 1 hour. However, for more complete conversion it is desirable to continue polymerization for at least 3 hours and for even longer periods.

For use in tire compositions it is desirable to have butadiene polymers with the butadiene portion having 1,2 content in the range of 25–45 percent, preferably 30–40 percent, with the remainder being essentially trans-1,4. It is also desirable that the polymers have a glass transition temperature (Tg) in the range of −65° to −80° C., and a Tm of about 30° to 45° C. These values are attainable by the process of this invention. In contrast, when the polymerization is conducted with Alfin catalyst modified with the aliphatic ethers disclosed by the Foster patent cited above the 1,2 content is in the range of 50–70 percent, the Tg is about −50° C. and there is no Tm.

When embodied in tire compositions, the polymers of this invention show excellent traction both wet and dry and at room temperature and 212° F. The excellent dry traction is demonstrated in a racing car tire test using a present commercial tire composition as a control. The Alfasole K product tested is a blend of a number of runs produced by the procedure of the above Example IV with the composite having 15 percent block polystyrene and a Mooney viscosity of 100.

| Test | Control | Alfasole K-16724 |
|---|---|---|
| Stanley London Traction (Room Temp.) | 104.4 | Better |
| Stanley London Traction 250° F. | 114 | Equal |
| Durometer (R.T.) | 71 | Sl. softer |
| Durometer 250° F. | 56 | Equal |
| 200% Modulus | 700 | Equal |
| 212° F. Rebound | 36 | Higher |
| Running Temp. | 342° F. | Sl. lower |

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

The invention claimed is:

1. A process for the hydrocarbon solution polymerization of a monomer composition containing at least 40 percent conjugated diene to produce a polymer having 25 – 45 percent of the diene in the 1,2 configuration and the remainder being predominantly of the trans-1,4 configuration and a molecular weight of about 5,000 to 500,000 comprising the steps of maintaining said monomer composition at a temperature of 30°–200° C. in intimate contact with a catalyst composition consisting essentially of:

a. a sodium allyl compound having 3–10 carbon atoms;
b. a sodium alkoxide of no more than 10 carbon atoms, and
c. an alkyl-aryl ether in which said alkyl group has 1–8 carbon atoms and said aryl group is phenyl, tolyl, xylyl or naphthyl; the concentration of said catalyst composition being 0.1–4 millimoles of catalyst per 100 grams of said monomer composition, said sodium alkoxide being present in said catalyst composition in a proportion of 0.5–2.5 moles per mole of sodium allyl compound, said ether being present in a proportion of 1–10 grams per 100 grams of monomer composition, said polymerization being conducted for a period of at least one hour, and said monomer composition consisting essentially of 40–100 percent by weight of said conjugated diene and 0–60 percent by weight of an aromatic monomer having no more than 20 carbon atoms selected from the class consisting of vinyl and isopropenyl aryl compounds and derivatives thereof in which the derivative group is an alkyl, aralkyl, cycloalkyl or chlorine attached directly to the aromatic nucleus thereof.

2. The process of claim 1 in which said alkyl aryl ether is a methyl ether.

3. The process of claim 1 in which said alkyl aryl ether is a phenyl ether.

4. The process of claim 1 in which said alkyl aryl ether is anisole.

5. The process of claim 4 in which said conjugated diene is 1,3-butadiene.

6. The process of claim 5 in which said monomer composition is 100 percent 1,3-butadiene.

7. The process of claim 5 in which said monomer composition is at least 70 percent by weight 1,3-butadiene.

8. The process of claim 5 in which said monomer composition consists essentially of 40–99 percent by weight 1,3-butadiene and 1–60 percent by weight of styrene.

9. The process of claim 5 in which said monomer composition consists essentially of 70–95 percent by weight of 1,3-butadiene and 5–30 percent by weight of styrene.

10. The process of claim 5 in which said sodium allyl compound is sodium allyl.

11. The process of claim 8 in which said sodium allyl compound is sodium allyl.

12. The process of claim 1 in which said sodium allyl compound is sodium allyl.

13. The process of claim 12 in which said sodium alkoxide is sodium isopropoxide.

14. The process of claim 13 in which said temperature is 40°–150° C.

* * * * *